US00RE35082E

United States Patent [19]

Kuo

[11] E Patent Number: Re. 35,082

[45] Reissued Date of Patent: Nov. 7, 1995

[54] VIBRATING AND SONIC DEVICE FOR TOY GUN

[75] Inventor: Tien-Hsiang Kuo, Taipei, Taiwan

[73] Assignee: S. R. Mickelberg Company, Inc., Jenkintown, Pa.

[21] Appl. No.: 62,508

[22] Filed: May 14, 1993

Related U.S. Patent Documents

Reissue of:

[64] Patent No.: 5,059,150
Issued: Oct. 22, 1991
Appl. No.: 617,682
Filed: Nov. 26, 1990

[51] Int. Cl.[6] ..... A63H 5/04

[52] U.S. Cl. ..... 446/405; 446/434

[58] Field of Search ..... 446/23, 397, 405, 446/406, 407, 484, 485; 128/34, 36; 601/67, 68, 69, 70, 72, 73

[56] References Cited

U.S. PATENT DOCUMENTS

| | | | |
|---|---|---|---|
| 2,255,799 | 9/1941 | Meinzer . | |
| 2,734,310 | 2/1956 | Christopher . | |
| 3,375,381 | 3/1968 | Tavel . | |
| 3,504,665 | 4/1970 | Bakunin et al. . | |
| 3,530,617 | 9/1970 | Halvorson et al. . | |
| 3,570,176 | 3/1971 | Palmer . | |
| 3,710,785 | 1/1973 | Hilger | 128/36 |
| 3,792,548 | 2/1974 | Hamano . | |
| 3,991,751 | 11/1976 | O'Rourke . | |
| 4,171,811 | 10/1979 | Meyer et al. . | |
| 4,175,353 | 11/1979 | Pickett . | |
| 4,236,348 | 12/1980 | DuLac . | |
| 4,295,240 | 10/1981 | Lex | 128/36 X |
| 4,669,452 | 6/1987 | Osawa . | |
| 4,750,641 | 6/1988 | Chin-Fu . | |
| 4,808,143 | 2/1989 | Kuo . | |
| 4,878,489 | 11/1989 | Kamayachi . | |

FOREIGN PATENT DOCUMENTS

| | | |
|---|---|---|
| 33688 | 2/1987 | Taiwan . |
| 1025438 | 6/1983 | U.S.S.R. . |

*Primary Examiner*—Sam Rimell
*Attorney, Agent, or Firm*—Caesar, Rivise, Bernstein, Cohen & Pokotilow, Ltd.

[57] ABSTRACT

A vibrating and sonic device for toy gun installed in a chamber of a toy gun body comprises a motor driven by pulling a trigger and a eccentric cam generating shaking effect which is directly transmitted to the toy gun body. Another effects of sound "Bang! Bang! Bang!" as well as flashes are also included.

3 Claims, 1 Drawing Sheet

VIBRATING AND SONIC DEVICE FOR TOY GUN

Matter enclosed in heavy brackets [ ] appears in the original patent but forms no part of this reissue specification; matter printed in italics indicates the additions made by reissue.

BACKGROUND OF THE INVENTION

Conventional toy guns often are designed to generate sound effects simulating actual ballistic explosions or other fanciful sound effects associated with cosmic ray guns. In some cases the sound effects are accompanied by flashes of light generated by light bulbs carried on or within the toy gun.

A toy gun having a vibration-producing mechanism in addition to the ballistic sound effect mechanism and flashing light mechanism, would be an interesting toy which many children might find enjoyable.

SUMMARY OF THE INVENTION

The present invention relates to a vibrating and sonic toy gun, and more particularly, to a toy gun having a trigger-controlled vibrating and sonic device designed to make the toy gun more interesting, more life-like and more exciting to children.

BRIEF DESCRIPTION OF DRAWINGS

This invention may be best understood by making reference to several drawings and specially describing one of the preferred embodiments.

DETAILED DESCRIPTION OF THE INVENTION

Figure 1:
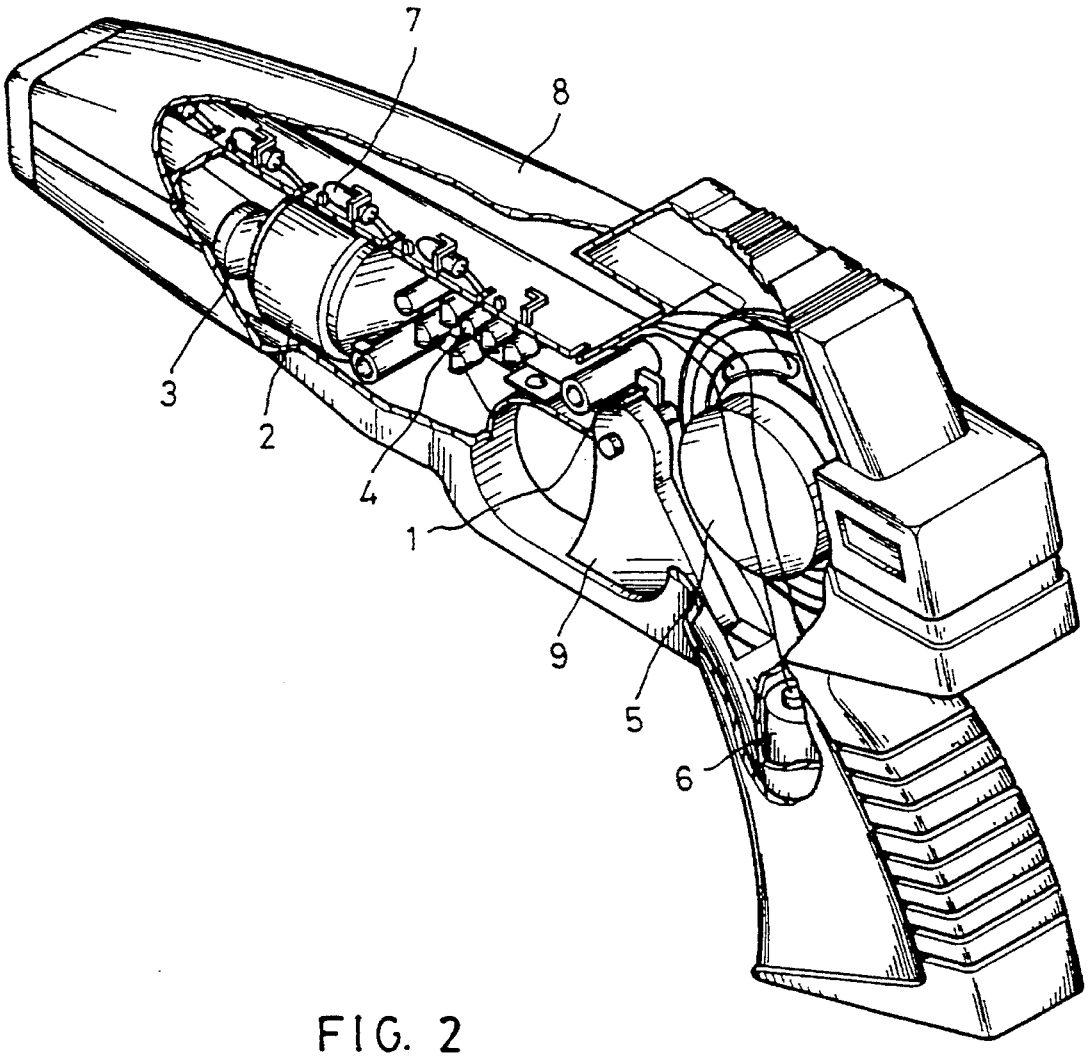
FIG. 1 is a partially sectional view of an embodiment of the present invention, showing the internal structure.

A toy gun having a vibrating and sonic device for toy gun is illustrated in FIG. 1. The gun comprises an on/off switch 1, a DC motor 2, an eccentric cam 3, a sound-generating circuit 4, a megaphone 5, batteries 6 and a number of light bulbs 7 associated together and confined in a hollow chamber 8 of the toy gun. A trigger 9 is pulled to immediately turn on the switch 1 whereby the batteries 6 are electrically connected to the DC motor 2. An eccentric cam 3 is firmly secured onto the shaft of the motor 2. The cam 3 rotates and transmits a vibrational force to the hollow barrel portion of the toy gun 8. The rotational speed of the cam 3 can be reduced by incorporating a speed-reducing gear set in motor 2. The cam action provides a vibrating sensation for the child holding the toy gun. The sound-generating circuit 4, when activated by switch 1, causes the megaphone to emit a chain of sounds such as "Bang! Bang! Bang!" Bulbs 7 are illuminates to provide additional interest and enjoyment.

Figure 2:
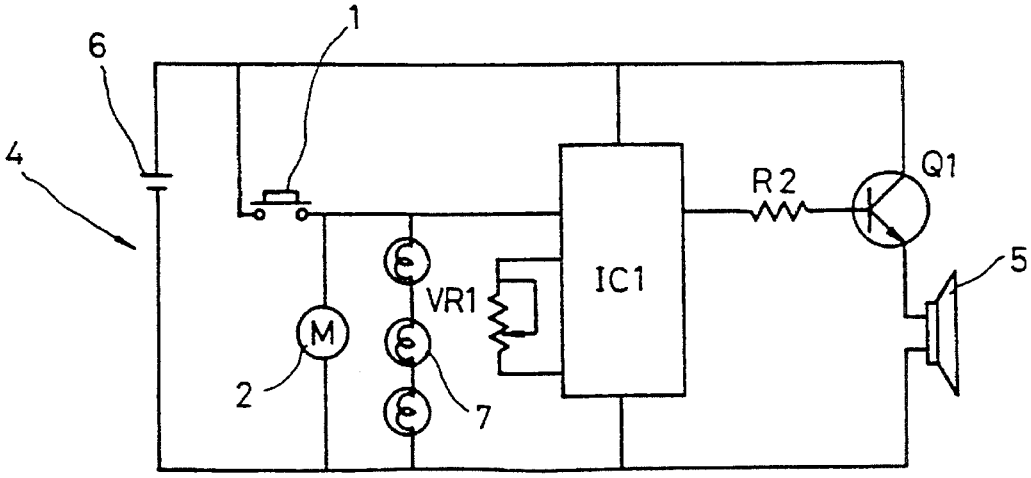
FIG. 2 is a circuit diagram of electric circuitry used in the FIG. 1 the embodiment of the present invention.

As illustrated in FIG. 2, the batteries 6 define a power supply for the circuit comprising motor 2, lamps 7, and megaphone 5. When the switch 1 is turned on a signal is generated to trigger off the IC1 which reads the shooting sound stored therein. Through a resistor R2, the megaphone 5 is driven by a transistor Q1 to then generate a train of shouting sounds such as "Bang! Bang Bang!". Sound intensity is adjusted by a resistor VR1.

What is claimed is:

1. A simulated toy gun comprising a gun body having a hollow handle and an elongated hollow gun barrel extending forwardly therefrom, said barrel having a longitudinal hollow side wall; a finger-operated trigger located in the gun body at the juncture of the handle and barrel; a rotary electric motor means mounted in the gun barrel remote from the trigger, said motor means having a rotary output shaft extending longitudinally within the barrel; and a weighted cam attached to said shaft so that the cam axis is eccentric to the shaft axis; said cam being attached only to the shaft so that the cam rotates free in space around the shaft axis without physical engagement with any structure other than the shaft; said cam having sufficient size to shake the barrel side wall during rotation of the shaft by the motor means; [battery means located in the hollow handle;] battery means located in the hollow handle; an electrical switch located within the gun body in near proximity to the trigger, said switch having an actuator operably connected to the trigger whereby hand actuation of the trigger electrically closes the switch; and electric connections between the battery means and switch and motor means, whereby manual finger pressure on the trigger energizes the motor means so that the cam [means] is rotated freely around the shaft axis to cause the hollow gun barrel to vibrate in directions transverse to the barrel longitudinal dimension.

*2. A toy gun comprising an elongated gun body having inner walls defining an interior compartment; a finger trigger means; a single rotary output shaft; rotary electric motor means for driving said single rotary output shaft, said electric motor means and said output shaft being disposed in said interior compartment; electric circuit means disposed in said interior compartment for energizing said rotary electric motor by said finger trigger means; and a cam disposed directly on said rotary output shaft, said cam eccentrically disposed about an axis of rotation of said rotary output shaft, said cam revolving free in space and contacting only said rotary output shaft, whereby said toy gun vibrates in a direction substantially transverse to said elongated body, thereby transmitting vibrations to a user of said toy gun, said electric circuit means further comprising megaphone means for generating sound waves; and electrically actuated megaphone switch means for connecting said battery means to said megaphone means, whereby said electrically actuated megaphone switch means connects said battery means to said megaphone means when said switch means is closed by said finger trigger means.*

*3. A toy gun comprising an elongated gun body having inner walls defining an interior compartment; rotary drive means; rotary electric motor means for driving said rotary drive means, said electric motor means and said rotary drive means being disposed in said interior compartment; electric circuit means disposed in said interior compartment for energizing said rotary electric motor means; and rotary vibration means disposed in said interior compartment, said rotary vibration means revolving free in space and contacting only said rotary drive means, whereby said rotary vibration means vibrates said toy gun in a direction substantially transverse to said elongated gun body, thereby transmitting vibrations to a user of said toy gun, said electric circuit means comprising light means; battery means for energizing said electric circuit means; switch means for opening and closing said electric circuit means; and finger trigger means disposed on said gun body for actuating said switch means whereby said rotary electric motor and said light means are energized when said switch means is closed by said finger trigger, said electric circuit*

*means further comprising megaphone means for generating sound waves; and electrically actuated megaphone switch means for connecting said battery means to said megaphone means, whereby said electrically actuated megaphone switch means connects said battery means to said megaphone means when said switch means is closed by said finger trigger means.*

* * * * *